Jan. 3, 1939.    W. H. SLOAN    2,142,289
AIR CONDITIONING APPARATUS
Filed March 22, 1937    4 Sheets-Sheet 4
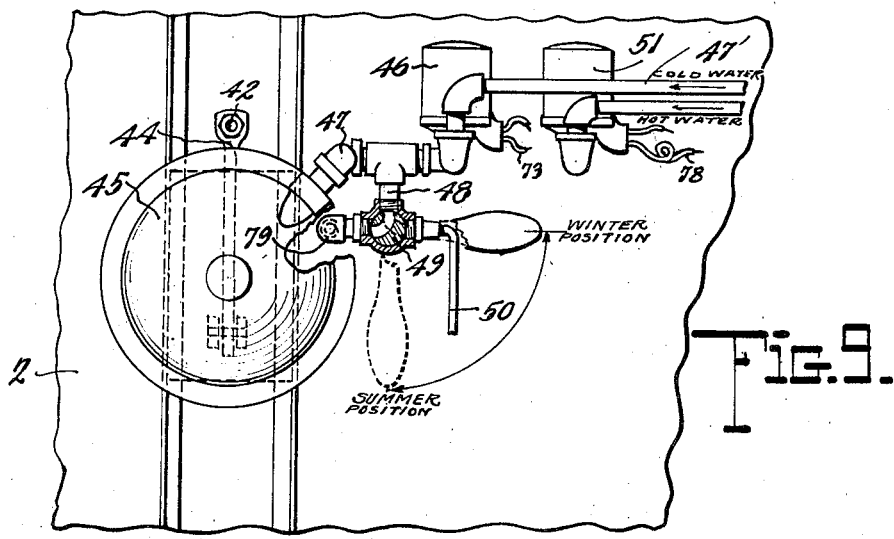
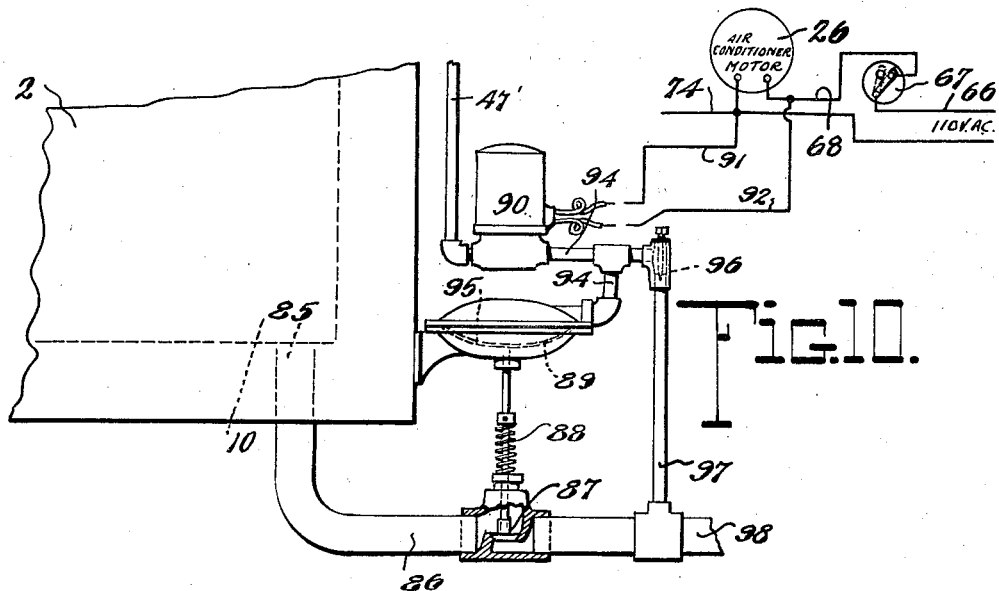

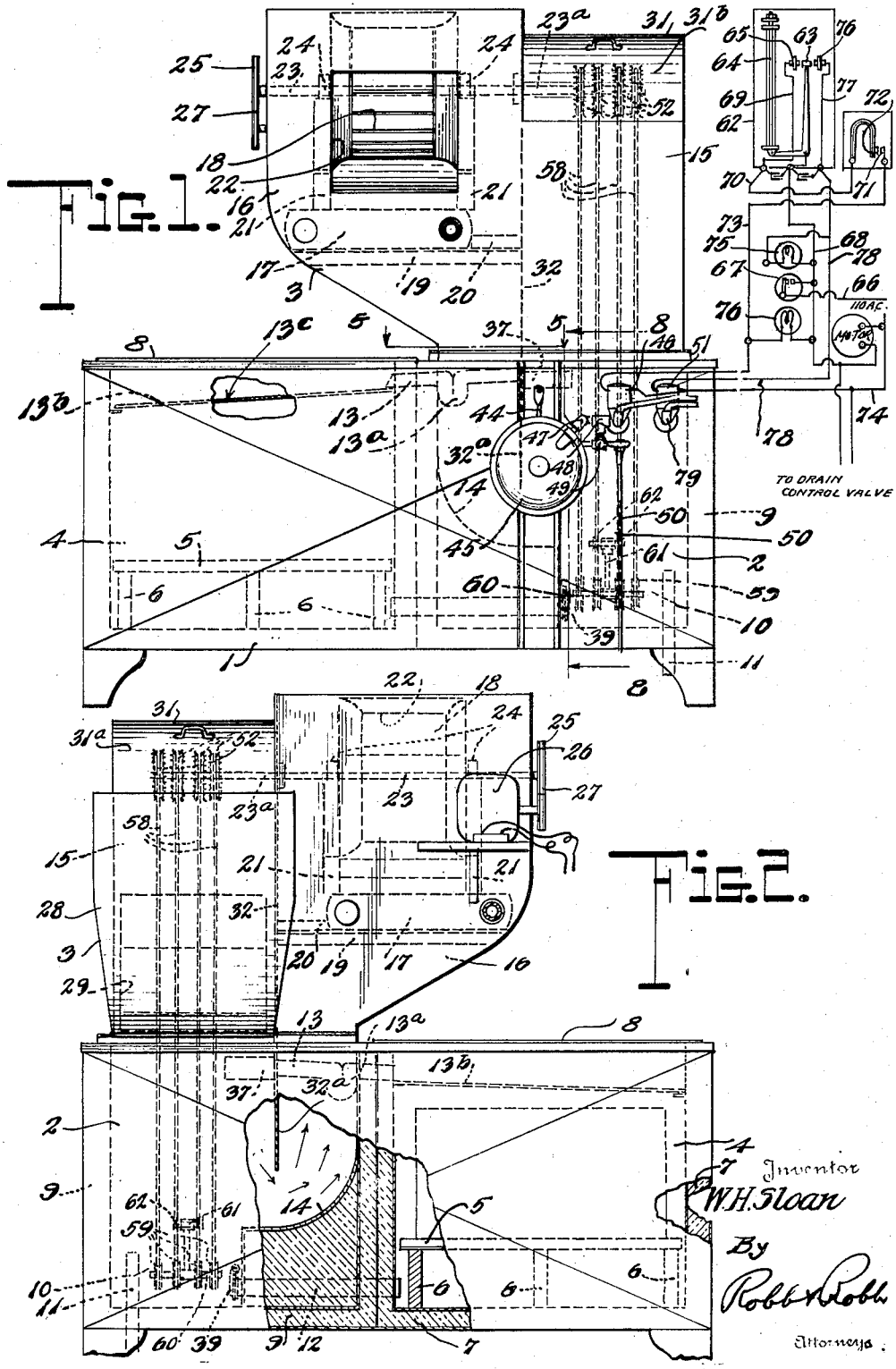

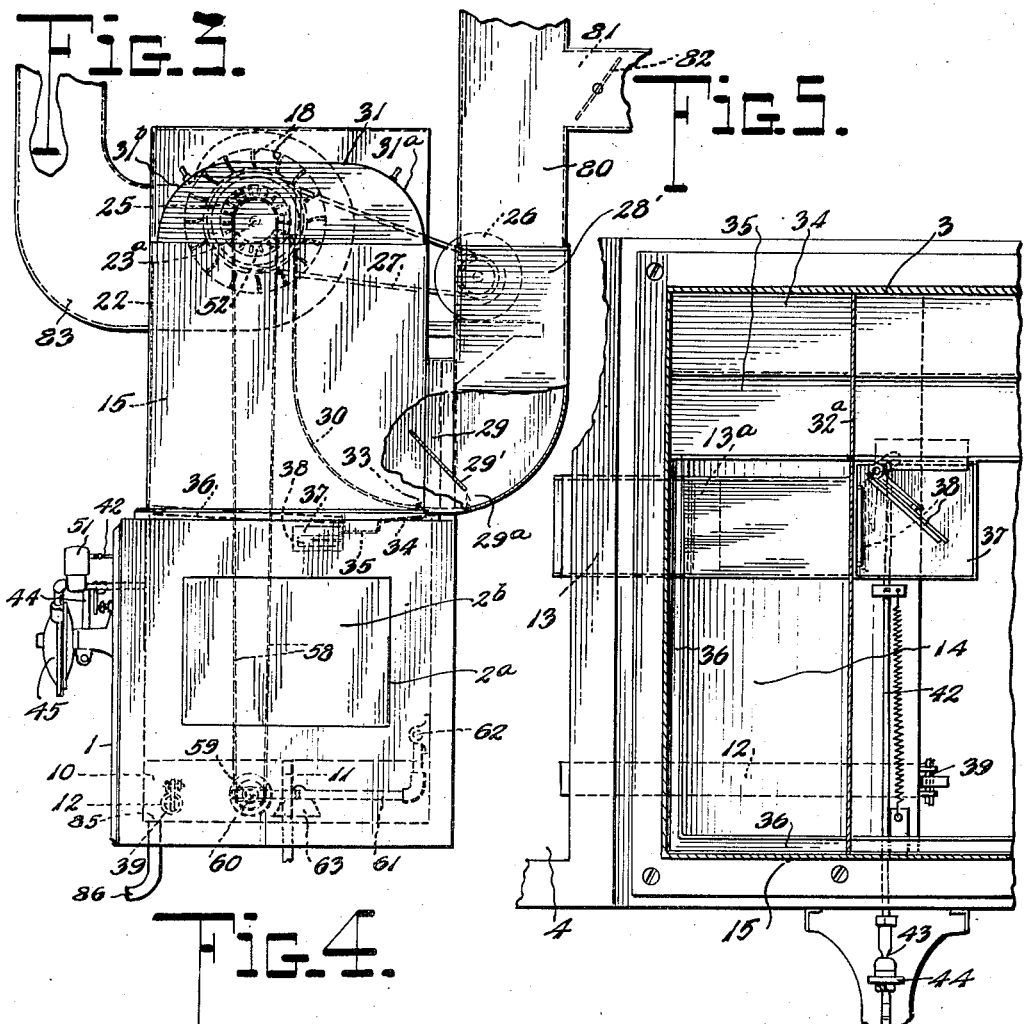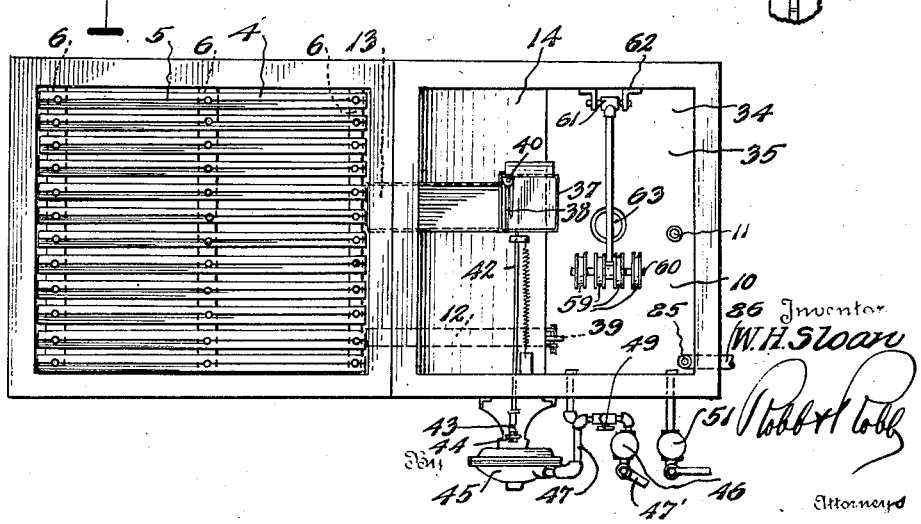

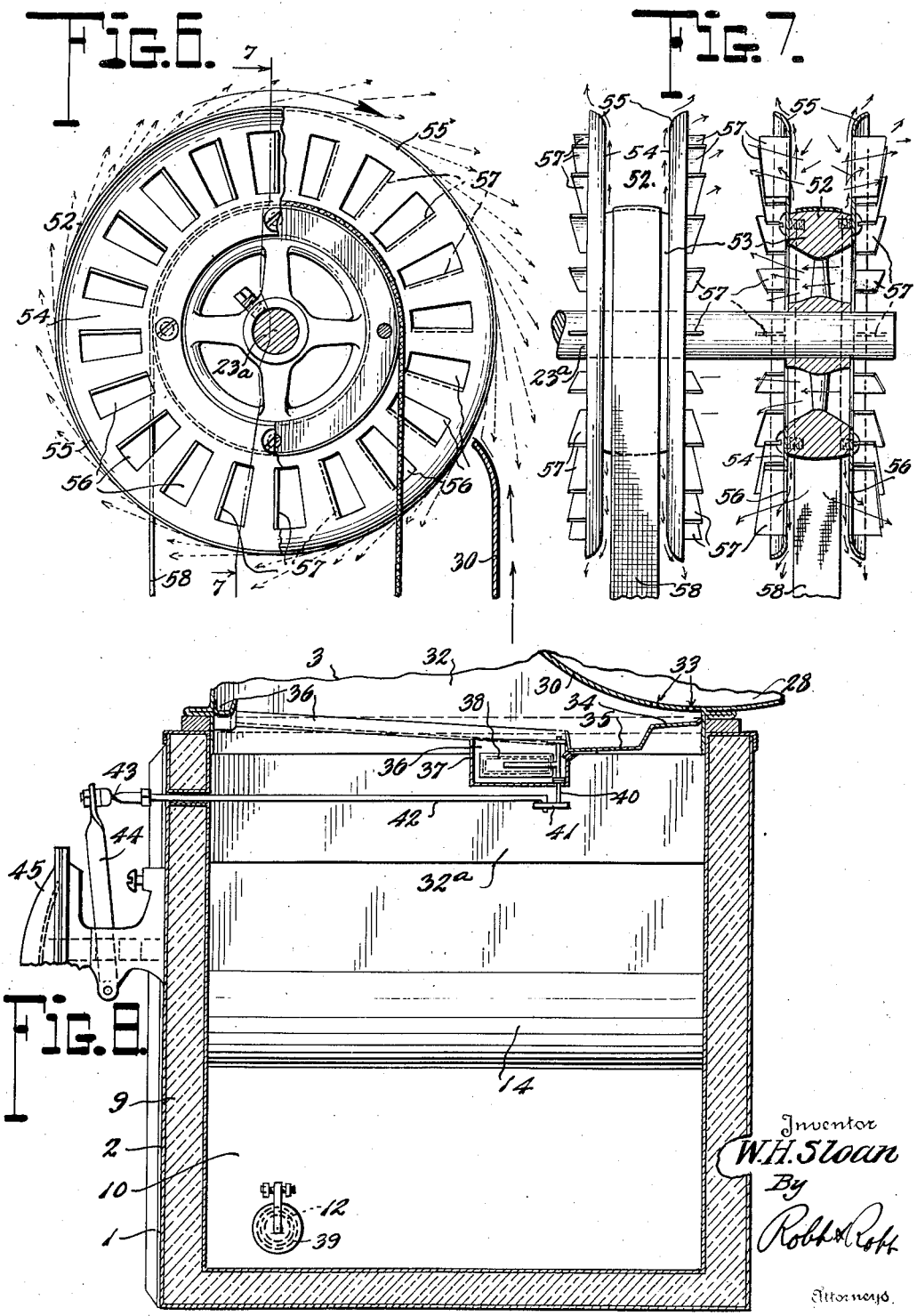

UNITED STATES PATENT OFFICE 2,142,289

AIR CONDITIONING APPARATUS

William H. Sloan, Washington, D. C.

Application March 22, 1937, Serial No. 132,374

13 Claims. (Cl. 261—11)

The present invention relates to improvements in air conditioning apparatus especially designed for dwellings or other buildings and by means of which the relative humidity of the space to be conditioned is effectively controlled.

In systems heretofore proposed, the air has been variously treated to condition it, both as regards humidity and temperature, and primarily it has been subjected to washing by water, in many of these systems, to provide the necessary humidity and temperature characteristics.

To this end, air has been recirculated through the space to be conditioned and apparatus in which water, either artificially or naturally cooled and properly sprayed or streamed, acts to clean and impart a sufficient moisture content and cooling temperature to the air as the latter passes over or through this machine, a certain amount of air from outside the building being introduced into the recirculated stream to maintain the desired freshness.

One of the primary objects of this invention is the provision of a direct control of the relative humidity of the space to be conditioned by a variation in the temperature factor of the wash water. In this respect, I have found that this temperature factor of the wash water is a critical one in the maintenance of a fixed condition of relative humidity in the space to be conditioned. Heretofore it has been proposed to maintain a fixed temperature of the wash water and to control the relative humidity of the space to be conditioned by passing more or less of the circulated or fresh air through the air washer.

From numerous experiments which I have made, I have found that the temperature of the wash water in a system of this type is a highly critical factor to deal with and may be availed of to effect practically a perfect and sensitive control instrumentality for the maintenance of a predetermined relative humidity of the air in the space to be conditioned when its temperature is subjected to instantaneous regulation for the purpose of humidifying or dehumidifying the circulating air under the influence of a humidity regulator in the space to be conditioned or the air stream leading thereto.

Attempts have been made in air conditioning apparatus heretofore used, as above mentioned, to variably pass a portion of the circulated air around the conditioning apparatus depending upon the temperature of the space being conditioned, so that as the temperature increases, a greater portion of the air is passed through the conditioner and dehumidifier, and as the temperature decreases, more or less of this air is by-passed around the conditioner. This type of apparatus is not satisfactory for the reason that there is not a complete and effective conditioning of all of the air, with the result that the portion by-passed around the conditioner and not washed carries dust or objectionable foreign matter back again into the space to be conditioned.

In my apparatus in which all of the air is passed through the conditioner and washed, I obtain a thorough and complete washing and conditioning operation of all the recirculated air, as well as the fresh air, that is returned to the space to be conditioned.

Another object of my invention is the provision of heating means associated with the conditioner to raise the temperature of the air being conditioned to a predetermined degree when this is desirable for purposes of comfort, as in the winter season.

A further object is the provision of air washing and conditioning apparatus in which a water spray is provided, together with means for passing the air through the spray and means for controlling the critical temperature of the spray in direct ratio to the relative humidity of the air in the space to be conditioned under control of a humidity-responsive means whereby the temperature of the washing spray is automatically raised or lowered to either humidify or dehumidify as the moisture content of the washed air decreases or increases.

A further object is the provision of a relatively small reservoir for supplying the air washing water in combination with a humidity-responsive means disposed in the air after it has been conditioned for adding hot water to the reservoir when the predetermined humidity content of the air is low, and cold water to the reservoir when the moisture content of the air being conditioned is high.

A further object is the provision of means for automatically emptying the reservoir of wash water as an incident to the discontinuance of the operation of the conditioner.

Another object of the invention is the provision of improved means for effectively breaking up the water into an extremely fine spray and intimately intermingling the moisture particles with the air and projecting the water in a direction opposed to the circulation of the air through the apparatus.

A further object is the provision of signaling means to indicate whether the conditioner is humidifying or dehumidifying.

A still further object is the provision of a cold storage compartment adapted to contain a cooling medium in combination with means responsive to variations in the humidity of the air in the space being conditioned to effect circulation of a portion of the wash water through this cold storage compartment.

Other and further objects and advantages of the invention will be hereinafter set forth and the novel features thereof defined by the appended claims.

In the drawings:

Fig. 1 is a side elevation of my improved conditioner, certain of the temperature and humidity control units being diagrammatically illustrated;

Fig. 2 is a side elevation opposite to that shown in Fig. 1, parts being broken away and shown in section;

Fig. 3 is an end elevation, certain portions being broken away and shown in section;

Fig. 4 is a top plan view with the upper portion of the conditioner unit removed;

Fig. 5 is a fragmentary, sectional view taken about on the line 5—5 of Fig. 1;

Fig. 6 is a side elevation of one of the upper water and air mixing pulleys for the water elevating tapes, the right hand portion of the side flange being broken away, and the air deflector partition shown in section;

Fig. 7 is a view taken at right angles to Fig. 6, one of the pulleys being shown in section;

Fig. 8 is a vertical sectional view taken approximately on the line 8—8 of Fig. 1;

Fig. 9 is an enlarged fragmentary elevation, parts being broken away, the three-way valve and hot and cold water electrically-controlled valve being more particulary discosed; and Fig. 10 is a fragmentary view ilustrating my automatically controlled drain valve.

Like reference characters designate corresponding parts in the several figures of the drawings.

In the drawings, 1 indicates my improved air washer and conditioner generally, which comprises a lower base section 2 and an upper portion or section 3 and a cold storage or reservoir compartment 4 adapted to contain ice, solidified carbon dioxide or other cooling media, or, if desired, refrigerating coils may be disposed therein.

As disclosed in the drawings, this cold storage compartment 4 is provided with an ice rack 5 suitably spaced from the bottom of the compartment by blocks or supports 6 for the purpose of supporting the block of ice in closely spaced relation to the surface of the quantity of liquid cooling medium, such as water, which medium is maintained at a substantially constant level in the compartment.

This arrangement maintains a reserve quantity of cooling water in the cold storage compartment at all times and as the ice melts, the quantity of water is continually being replenished, there being an overflow port, later to be described, which prevents the level of the water in this compartment from rising above the level of the rack 5 due to the melting of the ice, or from any other reason.

The storage compartment 4 is suitably insulated to prevent heat loss by the packing material 7. A cover 8 is also provided, this being insulated against heat loss. The opposite end of the base portion 2 forming the lower part of the conditioner proper is also insulated against heat loss, as indicated at 9, and is constructed to provide a relatively small wash water reservoir 10 in the base portion thereof, having an overflow pipe 11 with its discharge port located at approximately the level of the rack 5 in the cold storage compartment.

A communicating passage or conduit 12 connects the reservoir 10 with the cold storage compartment to permit flow of water from said last mentioned compartment to the reservoir when desired, there being a check valve 39 in the reservoir 10 at the mouth of this conduit to prevent any return flow of the water in the reservoir 10.

A second valve controlled communicating passage 13 establishes communication between the upper portion of the cold storage compartment 4 and the upper portion of the base section of the conditioner proper. This passage is for returning the wash water from the conditioner side of the apparatus to the cold storage compartment side and is preferably provided with a water seal or trap 13a to prevent any interchange of air and gases between the compartment and the conditioner. A valve mechanism, later to be described, is located at the entrance end of the communicating passage.

The end wall 14 of the base of the conditioner section adjacent the cold storage compartment is curved downwardly toward the reservoir 10 in order to normally direct the washing water falling from the upper section of the conditioner back again into the reservoir 10. This wall also serves as an air deflector for directing the washed air upwardly toward the air heating coils and blower or fan, later to be described.

The upper portion 3 of the conditioner is removably secured to the lower portion 2 by any suitable means and comprises an air washing section 15 and an air heating and circulating section 16 in which the air heating coils or radiator heater unit 17 and the impeller fan or blower unit 18 are located.

The heating unit 17 is suitably supported in the section 16 on angle iron brackets 19 fastened to the walls of the section. A filler block 20 closes the space between the edge of the radiator unit and the sides of this section, while the fan unit 18 is suitably supported above the radiator unit on cross members 21 with its discharge opening in proper alignment with the discharge portion or duct 22. A shaft 23 carries the impeller fan rotor and is suitably supported in bearings 24. This shaft extends through both ends of the sections 15, one end of the shaft having a driving pulley 25 secured thereto adapted to be driven from the motor 26 by the driving belt 27, while the other end of the shaft 23 projects through into the washing section as indicated at 23a.

The air washing and conditioning section, as before indicated, includes the lower portion or section 2 and the upper section 15. The upper section comprises an air intake duct 28 curving downwardly and inwardly through the opening 29. A curved partition member 30 extends upwardly from the lower edge of the opening 25 to a point adjacent the pulleys 52 on the shaft 23a and directs the incoming air upwardly. A cover 31 having curved end walls 31a and 31b closes the upper end of the washer section and has its top portion in spaced relation to the upper end of the partition member 30 in order to direct the air currents across the top of this section and downwardly on the opposite side of the partition 30. A side wall 32 separates the washing section from the heating and blower section and has an extension 32a extending downwardly to a point spaced from the curved wall 14. The air passing downwardly in the section 15 is directed under this partition extension and upwardly into the heating and blower section 16.

Perforations or drain apertures 33 are formed in the lower portion of the partition 30 as indicated in Fig. 8 of the drawings, for draining the wash water projected downwardly into this upwardly extending air channel onto an inclined shelf 34 having a water cooling trough 35 extending across the section 15. A narrow inclined trough 36 extends around three sides of the lower portion of the section 15 for cooling the wash water that runs down along the sides of this section. The ends of this trough are arranged to discharge into the trough 35.

The collecting pan 37 receives the water from the troughs 35 and 36, this pan having the inlet end of the water return passage 13 extending thereinto. A valve member 38 is disposed in the pan and is adapted to close the entrance to the return passage 13 in one position and when open to permit the water collected in the troughs 35, 36 and pan 37 to enter the passage 13.

Passage 13 inclines downwardly toward the cold storage compartment 4 and due to the fact that the entrance to this passage is below the level of the water in the pan 37, water will flow by gravity upon opening of the valve into the cold storage section 4.

The passage 12 leading from the cold storage compartment into the reservoir 10 is provided with a check valve 39, gravity operated, to permit flow of water from the cold compartment when incoming water from the passage 13 raises the level of the water in the compartment 4. If desired, a trough extension 13b may be provided to direct the return water to the far side of the compartment 4 so as to provide a complete circulation of water through this compartment, and this return trough may be provided with apertures 13c to permit the water to drop directly on the cooling medium in the compartment.

The valve 38 is mounted on a shaft 40 extending through the bottom of the pan 37 that has an operating arm 41 secured thereto. One end of an actuating rod 42 is connected to the arm 41 at one end, the opposite end of the rod 42 being swivelly connected at 43 to a diaphragm operated lever 44, the pressure operated diaphragm device therefor being indicated at 45.

An electrically controlled valve 46 is provided for admitting water under pressure to the diaphragm device 45 under the control of a special electrical circuit later to be described.

The diaphragm device 45 is provided with a water supply pipe 47 which receives water under pressure from the service main 47' under control of the valve member or unit 46, there being a by-pass or bleed passage 48 for relieving the pressure of the water in the diaphragm device when the valve 46 closes.

A three-way valve 49, as seen in Fig. 9, is arranged to control the discharge from this bleed passage and when shifted in one position permits the discharge to enter the interior of the section 2 and be discharged into the reservoir 10. When the service water is sufficiently cool to cause proper dehumidification in the washing operation of the apparatus, the valve is shifted to the afore-mentioned position. However, when the temperature of the service water rises, as in the summertime, the three-way valve is shifted to its opposite position, which directs the discharge from the bleed passage 48 into the waste passage 50 which may discharge into a sewer or other suitable drain opening. The discharge port through the bleed opening is comparatively small so that sufficient pressure is built up in the diaphragm device when the valve 46 opens.

In the winter season, the three-way valve 49 is shifted to direct the water through the bleed passage into the conditioner section, while in the summer months when a cooling medium is used, this discharge from the bleed opening is directed to a point exterior of the conditioner so that the water discharge does not raise the temperature of the water in the reservoir 10 and thus reduce the efficiency of the apparatus.

A second electrically controlled valve 51 is provided for controlling the admission of warm or hot water from a suitable source to the small reservoir 10. When this valve is energized, hot water is admitted directly into the reservoir, as will later be described in connection with the control circuits.

Disposed on the fan shaft 23a are a plurality of pulleys 52 which are of special formation. These constitute my impeller and spray means for breaking up the water into a fine spray or mist and thoroughly intermingling the air being circulated and the water in order to obtain a maximum degree of washing and conditioning of the air.

Each of these pulleys comprises the hub portion 53 of spider formation having side flanges 54 formed of relatively thin material. The peripheral edges or rims of these pulleys are flared outwardly, as at 55 in Figs. 6 and 7 of the drawings, while the portion intermediate this flared rim and the hub is formed with a plurality of openings 56, the leading edge of each of these openings being provided with a laterally extending vane or blade 57. These pulleys are disposed on the shaft 23a in spaced parallel relation, as seen in Fig. 7, to permit a free circulation of air therebetween.

The pulleys 52 rotate in the direction of the arrow, as seen in Fig. 6, at a comparatively rapid rate and a portion of the water from the reservoir 10 carried upwardly by the left hand reach of the endless belt or tape member 58 is forced outwardly between the surface of the hub and the tape and moves radially outwardly along the inner flanged faces of the pulley.

The blades 57, rotating in advance of the opening 56, cause a low pressure area behind these blades creating a circulation of air and the elevated water through the openings. This water struck by the blades is broken up into a finely divided spray or mist and due to the circulation of air and water through the openings, a thorough intermingling of the air and water spray or mist is obtained.

The water passing outwardly along the inner surface of the rims or flanges 54 between the openings 56 is thrown off tangentially at the flared periphery of the pulley, and thus with the water thrown from the surface of the belt creates a further mixing action of the air and water since this water thrown off travels at a high velocity through the air in the washing section produces a radial curtain of water. The utilization of a plurality of these pulleys in comparatively close relation along the shaft 23a provides a series of these radial curtains, so to speak, or projected streams which are disposed in parallel vertical relation in the washing section of the conditioner, and with the impingement of the water against the blades, the positive circulation of air and water through the openings provides an extremely efficient air washing and conditioning mechanism.

Endless ribbon members or tapes 58 extend downwardly into the small reservoir 10, constituting means for elevating the wash water from the said reservoir to the mixing pulleys 52, the lower portions of these tapes being held in the reservoir by the guide pulleys 59. These guide pulleys are revolvably mounted on a shaft 60 pivotally carried on the horizontally pivoted bracket arm 61 pivoted at 62 to the inner wall of the base section 2. A weight 63 may be provided if necessary to maintain the desired tension on the tapes 58.

The end wall of the lower section 2 is provided with an opening 2a suitably fitted with a door or closure member 2b, removable for the purpose of gaining access to the wash compartment in order to make adjustments of the interior mechanism without disassembling the apparatus.

Under certain conditions where cool, dry air, as from the basement, is accessible, this door 2b may be left open and the wash water may be dispensed with, whereupon the apparatus will circulate a certain amount of this cool air through the space to be conditioned. The primary purpose of the opening, however, is for the adjustment or replacement of the belts or tapes 58.

As previously indicated, the temperature of the wash water is very critical for a given temperature of the circulated air, in order that moisture shall not be added to or taken from the circulated air when it contains the desired amount of moisture. In other words, a very slight rise in the temperature of the wash water above this critical point will cause the wash water to humidify the air during its washing operation, while, on the other hand, a slight drop in the temperature will immediately cause dehumidifying action by the wash water.

My control circuits for determining the critical temperature are shown somewhat diagrammatically in the right hand portion of Fig. 1 of the drawings and comprise a humidostat 62 having a movable contact member 63 operable by changes in the humidity of the conditioned air. As the moisture content increases, the hair control member 64 rocks the movable contact member 63 to the left causing the same to contact the stationary adjustable contact 65.

Tracing the electrical circuits, current flows through the wire 66, across the conditioner control switch 67 and along the neutral wire 68 to the movable contact arm 63. When the arm is in contact with the contact element 65, current flows from this point through the wire 69 and 70 and the contacts 71 of the thermostat 72.

This thermostat is arranged to interrupt the current flow through the circuit controlling the cold water supply and is usually set to open the circuit around 70 or 75 degrees which maintains the cold storage compartment 4 closed to prevent the waste of ice or other refrigerating medium on abnormally cold days in the summer season. This thermostat is a safety feature and does not function except in extreme cases when the temperature of the conditioned air becomes abnormally low.

Current flows from the thermostat 72 just mentioned over the wire 73 to the cold water solenoid valve 46 causing this valve to open, thus admitting pressure to the diaphragm device 45 and at the same time, when the three-way valve 49 is in the position shown in the drawings, admits the stream of cold water into the small reservoir 10.

Again tracing the circuit, current flows from the valve device 46 over the common return wire 74 to the power line, thus completing this circuit. A small signal light 75 is bridged across the wires 68 and 73 for the purpose of indicating that the cold water controls are being energized.

The hot water control circuit for raising the temperature of the water in the reservoir 10, is similar to the circuit just described. When the air being conditioned becomes too dry or lacks the desired amount of moisture according to the setting of the humidostat 62, the movable contact member 63 will be actuated by the moisture-actuated member 64 into contact with the stationary adjustable contact member 76. Current flows as before to the movable contact 63 and through contact 76, wires 77 and 78 to the solenoid-operated hot water control valve member 51 and returns over the common return wire 74, thus completing the circuit. Upon opening of the hot water valve, the hot water is discharged directly into the reservoir 10 through the pipe 79.

The circuit of the blower or circulating fan and the water elevating spray device is bridged across the wires 74 and 68 so that the motor circuit will be closed at all times, except when it is desired to discontinue the operation of the conditioner, in which event the main switch 84 will be opened.

The heating coils 17 are connected with any suitable heating plant, such as a gas-fired boiler (not shown) and the usual thermostat which controls the temperature of the space to be conditioned will thus control this part of the apparatus.

In the winter months the temperature of the water in the service supply main is sufficiently low for dehumidifying purposes and therefore it is not ordinarily necessary to furnish artificial or mechanical refrigeration in the cold storage compartment, since this compartment is only for the purpose of supplying a cooling medium for controlling the temperature of the wash water in order to maintain it sufficiently low for dehumidifying purposes. Where the conditioner is to be used for winter service only or where water can be obtained having a sufficiently low initial temperature so as to cause dehumidification, this cold storage compartment can be completely omitted from the apparatus.

In installing the apparatus, as seen in Fig. 3 of the drawings, the air intake duct 28 is connected by a flue or pipe 80 to the space to be conditioned (not shown).

A fresh air duct connects the pipe 80 with the exterior of the building for the purpose of admitting fresh air to the apparatus. A damper or other suitable control member 82 is provided for adjustably regulating the quantity of fresh air thus admitted. The return duct or flue 83 connects the discharge port 23 with the space to be conditioned for the purpose of conveying the washed and conditioned air back to the said space.

In the operation of the device, the air is circulated downwardly through the duct 28 and directed upwardly by the curved partition member 30 in opposing relation to the spray from the pulleys 52, this spray being directed downwardly toward the opening 29. This causes a thorough intermingling of the air and the water, and the critical temperature of this water spray determines the temperature of the air in this portion of the apparatus.

The humidostat is located in the space to be conditioned or in the air circulating duct. As the air is chilled by the wash water, excess moisture in the circulating air is condensed until the relative humidity of the space reaches that degree for which the humidostat is set. The cold water circuit is then broken by the movement of the arm 63 from the contact 65. At this stage a balanced condition is obtained. The breaking of the circuit, as aforesaid, permits the cold water supply valve 46 to close and it remains in this position until the moisture contents of the circulating air arises, either due to the excessive moisture content of the incoming fresh air or due to the warming up of the wash water by the circulation of the air in the space, whereupon the humidostat control will again open the cold water valve 46 to admit cold water into the reservoir 10 immediately causing a drop in the temperature of the wash water.

Assuming on the other hand that the moisture content of the space to be conditioned drops beyond that degree of relative humidity for which the humidostat is set, the arm 63 will move to contact 76 closing the circuit to the hot water valve 51, the opening of which admits warm or hot water into the wash water of the apparatus. The temperature of the wash water is thereby raised and in the washing operation the circulating air takes up moisture until the balanced condition between the wash water temperature and moisture content of the air is reached, whereupon the hot water valve circuit is broken under the control of the humidostat.

It will be understood that in the dehumdifying operation, as in the winter season, the conditioned air may feel uncomfortable or drafty, but this condition is effectively cared for by the usual control of the heating system in which is included the heating coil 17, through or over which the circulating air must pass. This coil is not essential to the operation of the air conditioning apparatus which is under the control of the humidostat, but at the same time, it is possible to employ this heating coil alone for heating the space to be conditioned because of the direct contact of the conditioned air therewith.

The thermostat 72 is employed in this system primarily as an auxiliary control, particularly useful in the heated or summer season. When the temperature of the conditioned space drops down on a cool day to an uncomfortable degree, this thermostat breaks the circuit to the cold water valve so as to discontinue inflow of the cold water and lowering of the temperature of the wash water.

The adjustable contacts 65 and 76 on the humidostat are set sufficiently far apart so that there is not a continuous alternation of the operation of the hot and cold water control valves. In other words, on a damp day the cold water valve will be operated so as to chill the wash water until the balanced condition, referred to above, is reached, at which time the cold water control contacts will be opened until the moisture in the air again becomes excessive in which event the humidostat will again close the cold water contacts.

On the other hand, assuming the weather to be extremely dry, the humidostat will close the hot water control circuits and gradually raise the temperature of the wash water causing moisture to be added to the air being circulated. When the balance is reached, the hot water valve will be closed interrupting the flow of hot water to the reservoir 10. This valve will remain closed until the air being circulated loses its moisture, in which event the humidostat will again cause the hot water circuit to be energized to again raise the temperature of the wash water and thus supply additional moisture to the air.

For the purposes of convenience in understanding this system, a brief statement of the operation of the water circulation may be useful. In the washing operation, it will be apparent from the foregoing detailed description that the water is elevated by the pumping apparatus, so-called, to the top of the conditioner where it is acted upon by the spray-producing pulleys. These reduce the water to a more or less finely divided state and in this condition it is projected against the surrounding walls of the section 15.

The water running down the wall in which the opening 29 is located drops as a curtain over the entrance to the conduit 80 and in its descent, it strikes a deflector plate 29' which causes it to fall in a second curtain from the lower end across the opening at 29a. The purpose of the deflector plate 29' is to reduce the noise which would otherwise be produced in the fall of the curtain of water onto the base of the conduit or partition plate 30.

The water passing through the openings 33 and running down from the sides of the section 15 into the troughs 36 passes into the cross trough 35 which discharges into the pan 37 and spills over this pan into the reservoir 10. When, however, in the operation of the conditioner cold water is called for to reduce the temperature of the wash water in the reservoir, the diaphragm member 45 forces the rod 42 inwardly, which in turn opens the door 38 in the pan 37, as shown in Fig. 5, allowing the water in said pan to be transferred to the cooling compartment 4. Here this water is cooled directly by the cooling medium contained therein, and as the water level rises in the compartment, it flows back into the reservoir 10 through the conduit 12 past the check valve in said conduit.

As long as the door 38 is in its open position, a circulation of the water through the cooling compartments and the reservoir 10 is produced and when the demand for the cooling water ceases, the cold water valve 46 closes, reducing the pressure on the diaphragm of the device 45, in turn effecting closing of the door 38.

The reservoir 10, as seen in Fig. 10, is provided with a drain opening 85 for discharging the contents of the reservoir. This drain opening is connected with the drain pipe 86 having a valve 87 normally held open by the spring 88 and arranged when in its closed position to prevent emptying of the reservoir 10.

Pressure means, such as the diaphragm-actuating device 89, is provided for closing the valve 87 and maintaining the same in closed position during the operation of the conditioner. An electrically controlled valve 90 is provided, the controlling circuits for the same being bridged across the operating circuits for the air conditioner motor 26. These circuit wires are indicated at 91 and 92.

Water or other suitable operating fluid under pressure is allowed to pass from the pipe 93 into communicating passages 94 and behind the diaphragm 95 of the diaphragm device 89 when the valve 90 is opened and the conditioner is in operation. This water will flex the diaphragm 89 downwardly, compressing the spring 88 and forcing the valve 97 onto its seat thus closing the drain passage 86.

A bleed opening is provided, as indicated at 96, for relieving the pressure behind the diaphragm 95 when the valve 90 closes, permitting the spring 88 to open the valve 87. The leakage from the bleed passage just mentioned, which is small and negligible, is conveyed through the pipe 97 into the waste pipe 98.

This automatic drain permits the conditioner to drain its washing water when the conditioner is cut out of operation, either by opening of the main switch 67 or for any other reason, and under the conditions the washing water will be replenished by fresh water at the beginning of each operation of the conditioner.

Having thus described my invention, what I claim as new and desire to secure by Letters Patent is:

1. Air conditioning apparatus of the class described, comprising an air washing means including a washing chamber having a water reservoir therein, means for raising the water and mechanically breaking it up into a finely divided curtain across the chamber comprising an endless tape dipping into the reservoir and a pulley having a peripheral flange provided with lateral openings and vanes adjacent the same, means for circulating the air through the space to be conditioned and through the water curtain of said chamber, a motor for driving said air circulating means and the pulley, and means for varying the temperature of the water according to a predetermined relative humidity in the conditioned space.

2. Air conditioning apparatus comprising air washing means including a water reservoir and drain therefor, means for circulating air through the space to be conditioned and through the washing means, means for effecting intermingling of the air and water in the washing means, means for effecting change of temperature of the wash water, comprising water supply for introducing water at different temperatures into the reservoir, a humidity regulator automatically controlling said supply for maintaining the humidity at a predetermined condition, and thermostatically-operated means for discontinuing the washing operation and separate means for draining the water reservoir at will and causing simultaneous discontinuance of the washing operation.

3. In an air conditioning apparatus of the class described, a base section having an air washing compartment and a cold compartment, an upper air circulating and washing compartment superimposed on said base section, a water reservoir in the base of said washing compartment having a passage leading to said cold compartment, valve means therefor to permit flow of water only from said cold compartment to said water reservoir, said base section having a second passage leading from said washing compartment to said cold compartment including a water collecting trough discharging into the last-mentioned passage, means for withdrawing water from said water reservoir and projecting the same across said washing compartment into said trough, means for circulating air to be conditioned through said projected water in the washing compartment, and valve means for controlling the passage of water from said collecting trough and said cold compartment.

4. In an air conditioning apparatus of the class described, a base section having an air washing compartment and a cold compartment, an upper air circulating and washing compartment superimposed on said base section, a water reservoir in the base of said washing compartment having a passage leading to said cold compartment, valve means therefor to permit flow of water only from said cold compartment to said water reservoir, said base section having a second passage leading from said washing compartment to said cold compartment including a water collecting trough discharging into the last-mentioned passage, means for withdrawing water from said water reservoir and projecting the same across said washing compartment and into said trough, means for circulating air to be conditioned through said projected water in the washing compartment, valve means for controlling the passage of water from said collecting trough and said cold compartment, and moisture-responsive means disposed in the path of the conditioned air for opening the last-mentioned valve upon presence of excessive moisture in the air being conditioned.

5. In an air conditioning apparatus of the class described, a base section divided into a cold storage compartment and a lower air washing section having a water reservoir in the lower part thereof, means for controlling the level of water in the reservoir, means in the base section for recirculating at least part of the water in said washing section through said cold storage compartment including a lower conduit leading from said cold water storage compartment to said reservoir, and an upper conduit leading from said washing section into said cold compartment having water collecting means disposed in said washing section and discharging into said last conduit, an upper air washing section disposed over the base section having means for elevating water from said reservoir to the upper part of the last-mentioned washing section and projecting the water downwardly across the washing section into said water collecting means, and air circulating and directing means in said upper washing section for directing the air upwardly toward said water projecting means.

6. In an air conditioning apparatus of the class described, air circulating and water projecting means therefor comprising a power-driven shaft, a pulley fixed thereon, a second pulley located below the aforementioned pulley, an endless tape entrained over said pulleys, water supply means for supplying water to said lower pulley and the lower portion of said tape, said upper pulley having apertured side flanges and outwardly projecting vanes disposed between the apertures for producing a low pressure area in the vicinity of the apertures as the pulley revolves to create a movement of water and air through said pulley side flanges, and projecting the water and air outwardly upon impingement thereof by said vanes.

7. In an air conditioning apparatus of the class described, a casing, a water collecting reservoir therein, an air washing and circulating section, a motor-driven shaft projecting into said section, an air circulating fan disposed on said shaft in the circulating section, water elevating and air washing means in said washing section comprising a plurality of pulleys disposed on said shaft in side-by-side spaced relation, each pulley comprising a hub portion and spoke members supporting a rim portion having a pair of apertured side flanges terminating in an outwardly flared periphery, said side flanges having laterally projecting vane members extending outwardly in advance of each aperture with respect to the direction of rotation of the pulley, a flat endless tape member entrained over each pulley between the side flanges and having a portion thereof projecting into the water in said reservoir, and guide means in the reservoir for holding the tape immersed in the water in the reservoir.

8. In an air conditioning apparatus of the class described, a casing comprising an air washing section and an air circulating means for circulating air through said washing section, pulley means in the washing section for projecting water through said washing section and mixing of the water and air therein comprising a power-driven shaft, a pulley fixed thereon having a rim portion and apertured side flanges provided with laterally disposed radial vanes projecting from the outside of the pulley flanges in advance of the apertures with respect to the direction of rotation of the pulley, and water supply means for supplying water to the rim of the pulley and to the inside of the flanges in the vicinity of the apertures.

9. In an air conditioning apparatus of the class described, a base section having an air washing compartment and a cold compartment, an upper air washing and circulating compartment located above the base section having a side wall, a conduit leading from said cold compartment to the air washing compartment, a second conduit above the first conduit and leading from the washing section to said cold compartment, a water collecting trough on the side wall having a discharge outlet in communication with the second conduit, means in said upper washing compartment for projecting water spray across the washing section and against the said side wall, and means for circulating air through said projected water.

10. In an air conditioning apparatus of the class described, a base section having a washing compartment and a cold compartment isolated therefrom, a valved conduit leading from the lower part of the cold compartment to the lower part of said washing compartment to permit flow of water only toward said washing compartment, a second valved conduit inclining downwardly from the upper part of said washing compartment and discharging into said cold compartment, a water collecting trough disposed in said washing compartment above the last-mentioned conduit having a discharge passage emptying into the conduit, water projecting means disposed above said base section for projecting water toward said collecting trough, air circulating means for circulating air through said projected water, and moisture-responsive means for causing operation of the valve on the second valved conduit to establish a gravity flow of water through said cold compartment.

11. In an air conditioning apparatus of the class described, a casing comprising an air washing and circulating section and a cold compartment, means for projecting water through said washing section and for circulating air through said projected water, a cold water supply conduit leading from said cold compartment to said washing section, a second conduit above the first conduit and leading downwardly from said washing section into said cold compartment, a valve for closing said last conduit, means responsive to moisture for opening said valve upon presence of excessive moisture in the air being washed, including a water-operated diaphragm device having a bleed opening for relieving the pressure on the diaphragm, spring means for returning the diaphragm and valve to closed position, a three-way valve and connecting conduits for controlling the discharge from said bleed opening, one of said conduits discharging into said washing section and another of said conduits discharging exteriorly of the conditioning apparatus, said three-way valve being shiftable in one position to discharge the water from the bleed opening exteriorly of the conditioning apparatus and shiftable in another position to discharge the water aforesaid into the washing section of the conditioning apparatus, and a source of water under pressure for actuating said diaphragm device.

12. In an air conditioning apparatus of the class described, a casing having an air washing section and a cold compartment, said washing section having an air intake port intermediate the ends thereof and a dividing partition extending downwardly from the top portion of said washing section and inclining toward the lower edge of the intake port, said partition being provided in its lower portion with a water discharge aperture, water projecting means disposed at the top of said partition for projecting water downwardly toward the curved portion of said partition and said intake port, and a water collecting trough disposed in said casing below the apertures in the curved portion of the partition for receiving water discharging therethrough and returning the water to said washing section.

13. In an air conditioning apparatus of the class described, a casing having an air washing section and a cold compartment, said washing section having an air intake port intermediate the ends thereof and a dividing partition extending downwardly from the top portion of said washing section and curving toward the lower edge of the intake port, said partition being provided in its lower portion with a water discharge aperture, water projecting means disposed at the top of said partition for projecting water downwardly toward the curved portion of said partition and said intake port, a water collecting trough disposed in said casing below the apertures in the curved portion of the partition for receiving water discharging therethrough and return the water to said washing section, a valved conduit leading from said water collecting trough to said cold compartment, a second conduit leading from said cold compartment to said washing section, and means for circulating air to be conditioned through said intake port and said washing section.

WILLIAM H. SLOAN.